Sept. 10, 1957     H. B. BARRETT     2,805,713
TIRE TRUING LATHES

Filed March 14, 1955     4 Sheets-Sheet 1

*INVENTOR.*
HARRY B. BARRETT
BY
*ATTORNEY*

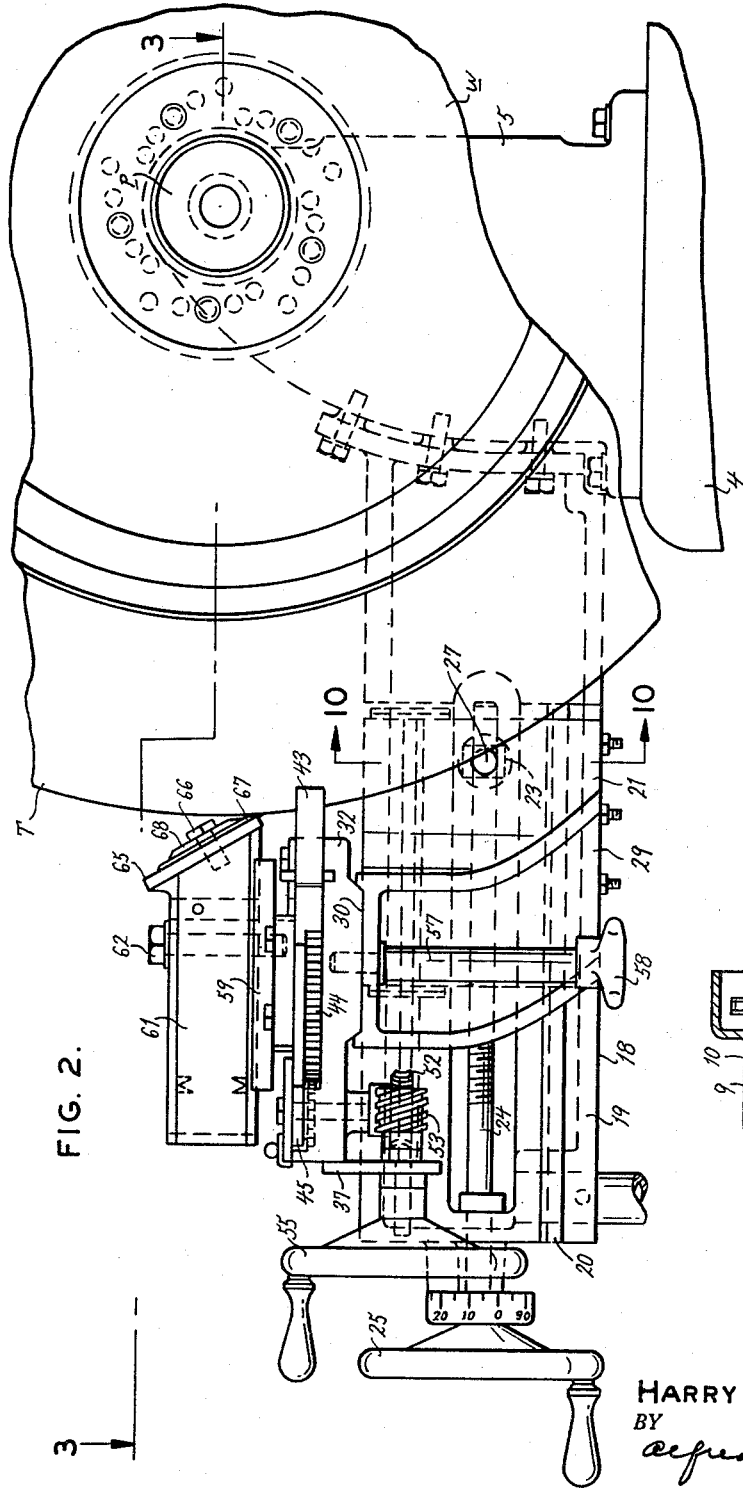

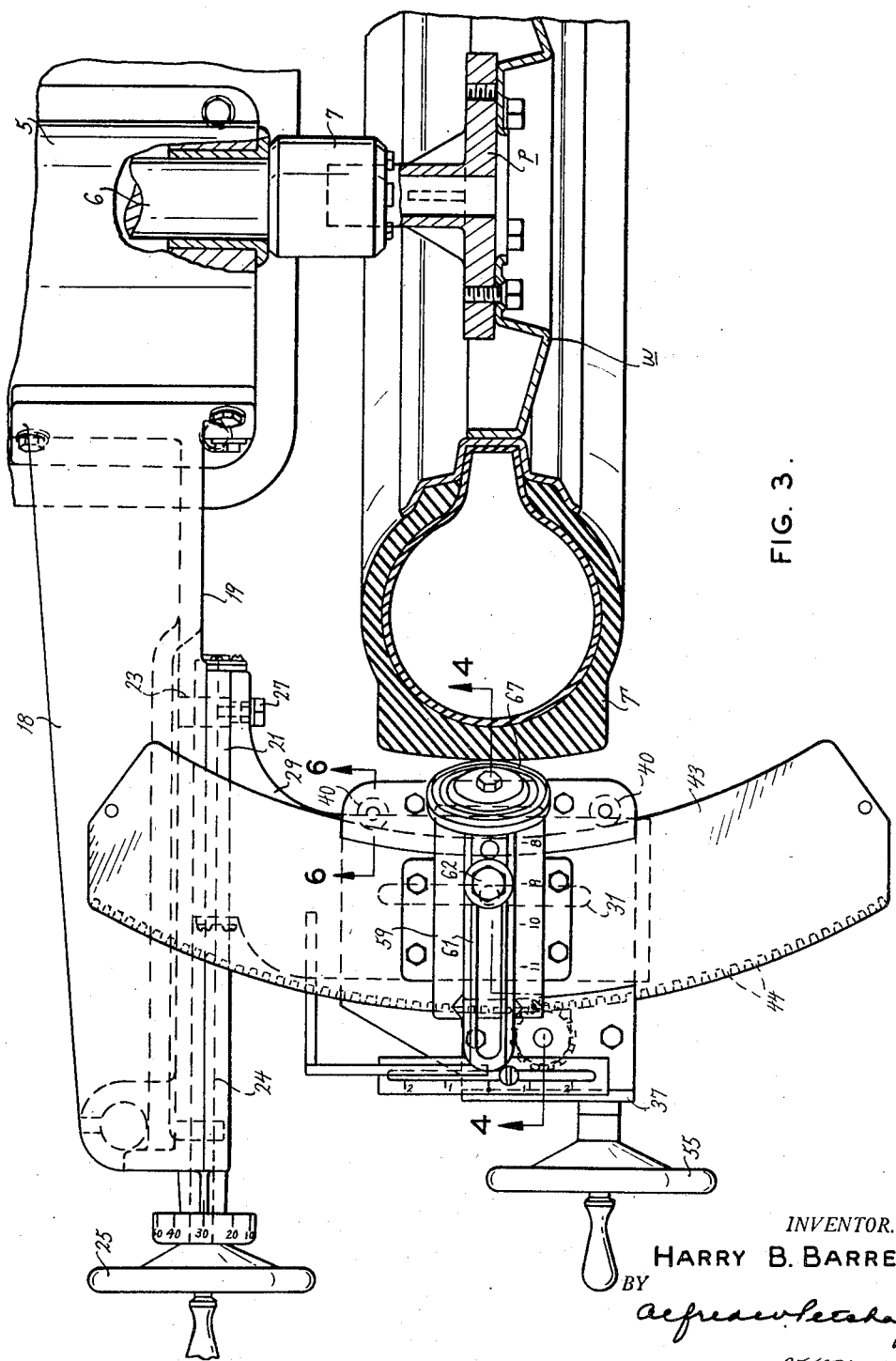

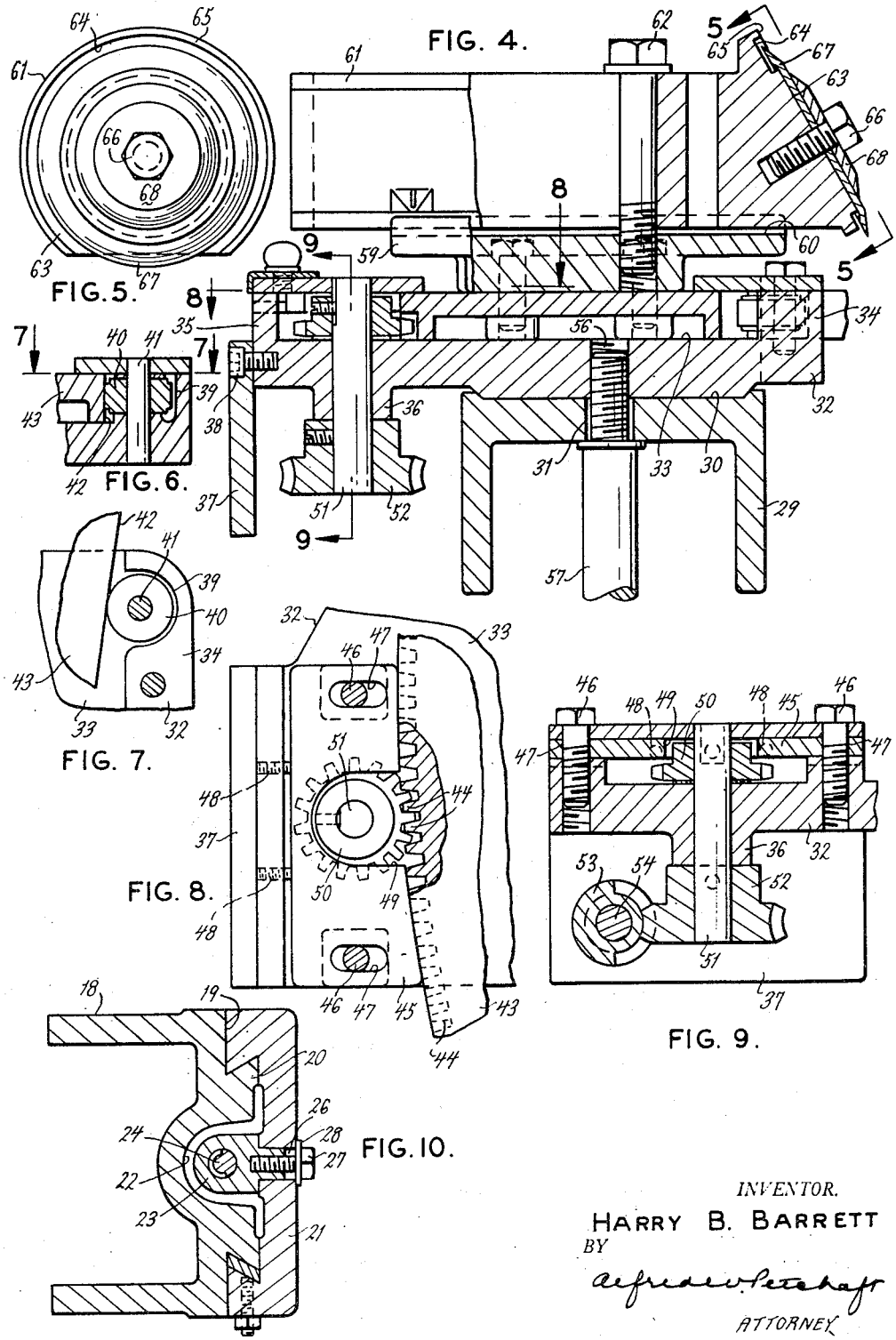

United States Patent Office 2,805,713
Patented Sept. 10, 1957

2,805,713

TIRE TRUING LATHES

Harry B. Barrett, Clayton, Mo.

Application March 14, 1955, Serial No. 493,915

4 Claims. (Cl. 164—10.2)

This invention relates in general to certain new and useful improvements in automotive repair and maintenance machinery and more particularly to a tire truing lathe.

The advent of high speed automotive travel has made it necessary to balance the wheels and tires of the vehicle. It has long been tought that inherent variations in the wall thickness and rubber density of the tire which tend to make the tire slightly heavier at various points around its circumference and similar variations in the wheel on which the tire is mounted, even though relatively slight, are nevertheless significant at high speeds and cause the wheel to vibrate, wobble slightly or otherwise run less smoothly than it would if it were perfectly in balance. Heretofore it has been conventional practice to deal with this situation by the so-called procedure of "wheel-balancing" which usually involves placing the wheel and inflated tire upon a motor-driven spindle so that it can be rotated at high speed to simulate or reproduce whatever vibration or wobble might be encountered in actual road use. By the application of various hand tools, chalk marking instruments and other devices it is possible to locate one or more places around the rim of the wheel at which small weights can be affixed to counterbalance the wheel and tire. This wheel-balancing operation is usually carried out when the tires are new and achieves a reasonably satisfactory result during the first thousand miles of use. As a result of recent investigation, however, it has been discovered that wheel imbalance is largely a result of tire eccentricity and most tires are sufficiently eccentric when mounted on the wheel and inflated to produce a substantial degree of vibration and wobble and in severe cases this type of defect cannot be corrected or compensated by the use of balancing weights. Furthermore, even where the degree of eccentricity is small enough to be corrected by balancing weights when the new tire is first applied to the wheel, wear, curb scuffing, flattening of portions of the tread during skidding and similar fortuitous circumstances encountered during road use quite frequently produce a condition of tire eccentricity rather early in the life of the tire with the result that the vehicle begins to ride somewhat roughly. The user, however, ordinarily attributes this difficulty to roughness in the surface of the road and as a result endures much rougher operation of the automobile than is necessary. In fact, periodic truing of the tires would produce much smoother riding qualities.

It has also been found in connection with the present invention that the eccentricity of tires can be corrected by rotating the tire and at the same time removing a very thin layer of rubber from the surface of the tread, the layer being slightly thicker in some places than in others, to whatever extent may be necessary to restore the tire to substantially perfect centric condition. It may superficially appear that the removal of a small amount of rubber from the surface of the tire tread would reduce tire-life but road tests have indicated that exactly the opposite is true. An eccentric tire will wear away more rapidly than a truly centric tire. It has been found in actual practice that a trued tire will tend to remain centric throughout its life unless subjected to some abnormal or accidental circumstance such as a violent skid which occurs during an automobile collision or something of that sort and that a tire as long as it remains centric will wear away uniformly and at a much slower rate than a tire which is eccentric even though the latter may have slightly more rubber at certain places around its tread than a comparable tire which has been trued.

It is, therefore, the primary object of the present invention to provide a machine for correcting the eccentricity of automobile tires or "truing" the tire as it is called.

It is another object of the present invention to provide a machine of the type stated which is capable of truing the road-engaging surface or tread of an automobile tire in a simple, quick, highly accurate and economical manner and which is capable of accomplishing such purpose with a minimum of removal of rubber from the tread.

It is another object of the present invention to provide a tire truing lathe which is precise in operation and can be quickly adapted for truing tires in a wide variety of sizes and will form the tread surface accurately to the desired arc as well as circumferential contour.

With the above and other objects in view, my invention resides in the novel features of form, construction, arrangement, and combination of parts presently described and pointed out in the claims.

In the accompanying drawings (four sheets)—

Figure 2 is a fragmentary side elevational view of the tire truing lathe shown in Figure 1;

Figure 3 is a fragmentary sectional view taken along line 3—3 of Figure 2;

Figure 4 is a fragmentary sectional view taken along line 4—4 of Figure 3;

Figure 5 is a fragmentary sectional view taken along line 5—5 of Figure 4;

Figure 6 is a fragmentary sectional view taken along line 6—6 of Figure 3;

Figure 7 is a fragmentary sectional view taken along line 7—7 of Figure 6;

Figure 8 is a fragmentary sectional view taken along line 8—8 of Figure 4;

Figure 9 is a fragmentary sectional view taken along line 9—9 of Figure 4;

Figure 10 is a fragmentary sectional view taken along line 10—10 of Figure 2; and Figure 11 is a fragmentary sectional view taken along line 11—11 of Figure 1.

Figure 1:
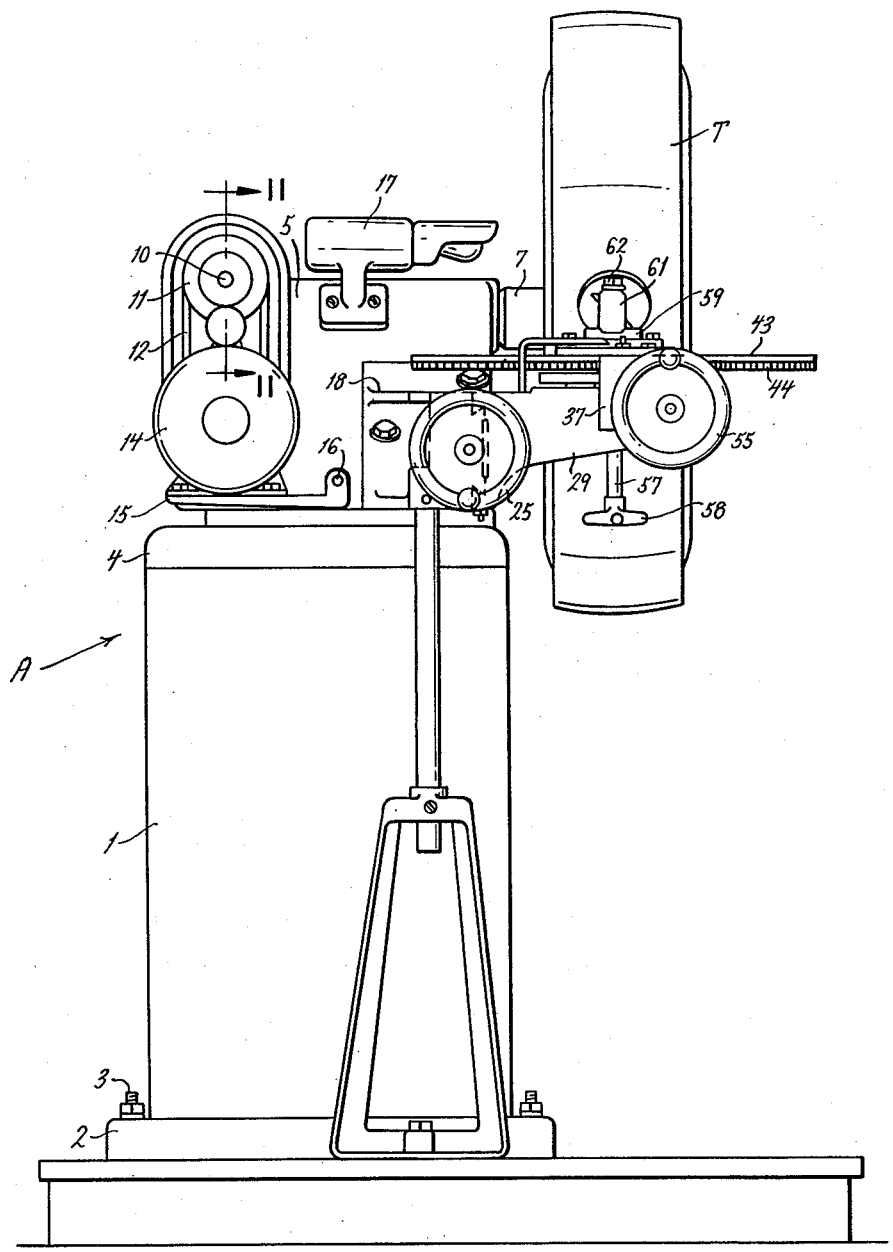
Figure 1 is a front elevational view of a tire truing lathe constructed in accordance with and embodying the present invention.

Broadly speaking, the present invention resides in the provision of a machine having an outwardly projecting spindle mounted for true and accurate rotation by a suitable prime mover such as an electric motor and being adapted to receive a wheel-mounted inflated automobile tire. The machine is also provided in outwardly spaced relation to the spindle with a tool carriage which can be accurately adjusted toward or away from the center line of the spindle to accommodate tires of various radial sizes and can be swung or rocked laterally from side to side with respect to the geometrical centerpoint of the wheel so as to form a laterally crowned surface on the tire tread conforming to a predetermined or desired arc. The tool carriage is arranged to support appropriate surfacing tools such as cutting knives and grinding wheels so that a thin cut of rubber can be removed from the tread to bring the surface into true concentricity both as to circumferential or annular contour and transverse or radially crowned contour. The machine is also provided with means for fitting the cutting tools inwardly and outwardly and transversely to and fro with respect to the tire so that the cutting operation can be carried out with both ease and accuracy.

Referring now in more detail and by reference characters to the drawings which illustrate a practical embodiment of the present invention, A designates a tire truing machine comprising a rectangular box-like base 1 having a bottom flange 2 adapted for securement to a floor or other supporting structure by means of suitable attachment bolts or studs 3. The upper end of the base 1 is provided with a flat horizontal bed plate 4 which supports an upwardly extending housing or shell 5. Journaled in and extending horizontally through the housing 5 is a spindle 6 provided at its outer end with a chuck 7. Keyed or otherwise rigidly fixed upon the spindle 6 interiorly of the housing 5 is a worm gear 8 which meshes with a driving worm 9, the latter being fixed upon the interior end of a drive shaft 10 journaled in and projecting outwardly through a side wall of the housing 5. On its outer end the shaft 10 is provided with a stepped pulley 11 which is in turn drivingly connected by means of a belt 12 to a driving pulley 13 of an electric motor 14, the latter being bolted to a supporting plate 15 which is in turn rockably mounted upon a pivot rod 16 which is in turn rigidly fastened to the housing or shell 5. Thus the motor 14 will tend to swing downwardly under its own weight and maintain the belt 12 operatively tight. Also mounted upon the outer face of the housing 5 is a work light 17 for directing light to the work when, as and if needed.

Rigidly bolted to the outer face of the housing 5 and extending forwardly therefrom in substantially perpendicular relation to the spindle 6 is a heavily rigid and rigidly reinforced arm 18 provided with a vertically lateral face 19 which is provided with a dove-tailed slide 20 for shiftably supporting a slide carriage 21. The slide 20 is provided with a longitudinal groove 22 for loosely accommodating a feed nut 23 which is threadedly mounted upon a feed screw 24 journaled at its ends in the arm 18 and being provided at its outer end with a calibrated hand wheel 25. The slide carriage 21 is provided with a slot or aperture 26 for engagement with the feed nut 23 and is locked thereon by a bolt 27 and washer 28. The threads of the feed nut 23 and feed screw 24 are of such size and pitch that the slide carriage 21 will be held securely in any position of adjustment along the slide 20. Formed integrally with, and extending laterally from, the slide carriage 21 is an arm 29 which is also rigid and substantial. In its top horizontal face, the arm 29 is provided with a shallow way-forming depression or channel 30 and a central slot 31 extending lengthwise of the channel 30. Slidably mounted within the channel 30 for transverse movement along a line perpendicular to the path of movement of the slide carriage 21 is an auxiliary carriage or slide 32 which is, in turn, provided with an upwardly presented accurately flat horizontal top face 33 which lies between upstanding bosses 34, 35, formed integrally with the auxiliary carriage 32 adjacent its forward and rearward margins. As will be seen by reference to Figure 4, the auxiliary carriage 32 projects outwardly from, and overhangs, the arm 29 toward the front and in the overhanging portion is integrally provided with a bearing hub 36 and a flat depending arm 37, which is secured rigidly to the forwardly presented face of the boss 35 by means of screws 38.

The boss 34 is vertically milled out to provide substantially semi-circular recesses 39 for loosely accommodating rollers 40, which are operatively mounted therein upon vertical journal pins 41. The rollers 40 are located adjacent the outer rear corners of the auxiliary slide 32 and project forwardly from the interior face of the boss 34 for operative engagement against the rearwardly presented vertical edge-face 42 of an arcuate slide plate 43 which rests flatwise upon the flat face 33 of the auxiliary carriage 32 and is provided at its forwardly presented convex margin with a series of rack-like teeth 44, the vertical top faces of which are accurately machined to an arc which is concentric with the rear face 42 and bears slidingly against a guide block 45 shiftably mounted on the overhanging portion of the auxiliary carriage 32 and adjustably held in place by bolts 46 which extend concentrically through elongated slot-like apertures 47 formed in the guide block 45. The forward margin of the boss 35 projects upwardly in front of the forward edge-face of the guide block 45 and is provided with two adjustment screws 48 which bear abuttingly against the forward edge-face of the guide block 45 to facilitate adjustment thereof.

The guide block 45 is, furthermore, centrally cut away from its rearwardly presented or arcuate bearing face in the provision of a clearance slot 49 which extends loosely around a pinion 50 rigidly fastened to the upper end of a shaft 51 which is, in turn, journaled in the bearing hub 36 and projects downwardly therefrom at its lower end. Similarly secured upon the downwardly projecting end of the shaft 51 is a worm gear 52 which meshes with a worm 53 keyed upon a forwardly extending horizontal shaft 54, the latter being journaled in and projecting forwardly from the arm 37 and being provided at its outer end with a hand wheel 55, all as best seen in Figure 2. The auxiliary slide 32 is provided with a threaded aperture 56 which is centered over the slot 31 for receiving the threaded end of a locking post 57 which projects downwardly therefrom through the slot 31 and below the arm 29, being provided at its lower end with a handle 58. Thus, the locking post 57 may be loosened and the auxiliary carriage 32 slid from side to side across the top of the arm 29 to any desired position of adjustment within appropriate limits. In other words, the auxiliary slide 32 can be set either closer to or further away from the arm 18.

Bolted or otherwise rigidly secured upon the plate 43 and extending upwardly therefrom is a tool slide 59 having a longitudinal way 60 for adjustably accommodating an elongated tool holder 61 which is secured in any position of adjustment thereon by means of a bolt 62. At its forward end, the tool holder is provided with an angularly machined circular face 63 which is circumferentially relieved to provide a clearance groove 64 and a semi-circular top flange 65. Removably secured to the face 63 by means of a bolt 66 is a circular cutter-knife 67 formed of relatively thin knife steel and reinforced against undue vibration by a heavy circular cover plate 68 which is of somewhat smaller diametral size and supports the knife or cutter 67 for the largest portion of its interior area. As will be noted by reference to Figure 4, the knife 67 projects downwardly and outwardly below the lower margin of the tool holder 61 for tangential engagement against the surface of a tire T which is inflated and mounted upon a wheel w which is, in turn, bolted to an adapter plate p for supported disposition within the chuck 7. The tool holder 61 can be adjusted within appropriate limits to any inward or outward position to vary the radial distance between the point of contact of the knife 67 and the center line or axis of rotation of the adapter p and chuck 7. Similarly, by suitable transverse adjustment of the auxiliary carriage 32, the positional relationship between the center point of the plate 43 and the vertical face of the adapter p to which the wheel w is fastened can be varied. In this connection, it should be noted that the face of the adapter p to which the wheel w is attached is substantially coplanar with the center plane of the tire T, that is to say, a plane which passes through the geometrical center of the tire perpendicularly to the axis of rotation thereof. Obviously, for different tires and wheels it is necessary to use different adapters and consequently it is necessary to shift the auxiliary slide 32 toward or away from the arm 18 to accommodate such variations. Similarly, different tires have different tubular sizes and as a result the radial contour or "crown" of the tread is different. The tool slide 61 can be adjusted toward or away from the axis of rotation of the chuck 7 to accommodate the variation. Finally, various tires have different overall radial sizes and the entire arm 29 can be adjusted inwardly or outwardly by turning the hand wheel 25 so as to shift the slide carriage 21 toward or away from the axis of rotation of the chuck 7.

In use, the tire T is mounted on the wheel w and inflated. The wheel w is then mounted on the adapter p and placed in the chuck 7. The motor 14 is then turned on and the tire T caused to rotate while a piece of carpenter's chalk or similar marking material is applied to the tread face. Thereupon, the auxiliary carriage 32 is adjusted laterally toward or away from the carriage slide 21 so that when the plate 43 is in centered position, the longitudinal axis of the tool carrier 61 will be exactly coincident with the center plane of the tire T. The hand wheel 25 is then turned to shift the carriage slide 21 and all of its supported mechanism inwardly until the cutting tool will just barely contact the surface of the tire tread face at any point. For convenience, it is preferable to shift the plate 43 laterally by the hand wheel 55 so that the cutting knife 67 will make its initial contact with the tread face at one or the other of the lateral margins. Thereupon, the hand wheel 55 can be turned slowly in order to traverse the plate 43 and the cutting tool 67 carried thereby, entirely across the tread face. If the tread face is exactly concentric and is radially crowned to the desired arc of curvature, the cutting tool 67 will remove a very thin cut of rubber from the entire tread face so that all evidence of chalk marking will be removed. In such case, the tire T is concentric and can be mounted upon the automobile. As is the usual case, however, the tire T is not actually concentric and the cutting tool 67 will remove portions of rubber from the tread face and miss other portions of the tread face so that after the first very fine cut is taken off, the tire T will have splotches of chalk at different points around its periphery. Thereafter, a series of very fine successive cuts can be taken removing small portions of the surface of the tread face until all chalk has been removed and the tire has been rendered completely concentric.

If desired, a final finishing operation can be employed which involves the substitution of a small motor driven grinding wheel for the knife 67 and the surface of the tread can be buffed therewith to produce a smooth finish resembling the initial finish on the tread face of a new tire as it comes from the vulcanizing mold.

It is should be understood that changes and modifications in the form, construction, arrangement, and combination of the several parts of the tire truing lathes may be made and substituted for those herein shown and described without departing from the nature and principle of my invention.

Having thus described my invention, what I claim and desire to secure by Letters Patent is:

1. A tire truing machine comprising a base having support means upon which an automobile wheel and tire assembly may be operatively mounted, means for rotating the support means and thereby revolving said tire and wheel assembly, a carriage movably mounted on the base in radially outwardly spaced relation to said tire and wheel assembly, means for adjusting the carriage toward and away from said tire and wheel assembly, an auxiliary slide shiftably mounted on the carriage for movement along a straight path which is perpendicular to the path of movement of the carriage, said auxiliary slide having an arcuate way formed in the upper face thereof, the chord of which is parallel to the axis about which the tire and wheel assembly revolves an arcuate plate operatively mounted for to-and-fro movement within the arcuate way, means mounted on the arcuate plate for presentation to the tread face of the tire for removing a part of the surface thereof, and means for feeding the arcuate plate to and fro along its arcuate path.

2. A tire truing machine comprising a base, a spindle rotatably mounted on the base, said spindle having means for engaging and supporting an automobile wheel and tire assembly, means for rotating the spindle, a carriage movably mounted on the base in radially outwardly spaced relation to the spindle, means for adjusting the carriage toward and away from the spindle, an auxiliary slide shiftably mounted on the carriage for movement along a straight path which is perpendicular to the path of movement of the carriage, said auxiliary slide having an arcuate way formed in the upper face thereof, the chord of which is parallel to the axis of the spindle and which curves outwardly from its chord in relation to the spindle, an arcuate plate operatively mounted for to-and-fro movement within the arcuate way, said plate being provided with a convex margin having gear-teeth, a cutting tool mounted on the arcuate plate for presentation to the tread face of the tire, and manually operable gear means meshing with said teeth of the arcuate plate for feeding said plate to and fro along its arcuate path.

3. A tire truing machine comprising a base, a spindle rotatably mounted on the base, said spindle having means for engaging and supporting an automobile wheel and tire assembly, means for rotating the spindle, a carriage movably mounted on the base in radially outwardly spaced relation to the spindle, means for adjusting the carriage toward and away from the spindle, an auxiliary slide shiftably mounted on the carriage for movement along a straight path which is perpendicular to the path of movement of the carriage, said auxiliary slide having an arcuate way formed in the upper face thereof, an arcuate plate operatively mounted for to-and-fro movement within the arcuate way, said plate being provided with a convex margin having gear-teeth, a cutting tool mounted on the arcuate plate for presentation to the tread face of the tire, and manually operable self-locking worm gear means meshing with said teeth of the arcuate plate for feeding said plate to and fro along its arcuate path.

4. A tire truing machine comprising a base, a spindle rotatably mounted on the base, said spindle having means for engaging and supporting an automobile wheel and tire assembly, means for rotating the spindle, said base bein provided adjacent its upper end with a forwardly extending substantially horizontal arm, said arm having a laterally presented face provided with a horizontal slide-way, a carriage operatively mounted on the arm for horizontal movement along the slide-way, means operatively associated with the carriage and the arm for adjusting the carriage to various positions along the slide-way toward and away from the spindle, said carriage having an upwardly presented face which is provided with slide-forming means, an auxiliary slide operatively mounted on the carriage for movement along the slide-forming means thereof in a direction which is cross-wise with respect to the direction of movement of the carriage, said auxiliary slide being provided in its upper face wth a groove having an arcuate vertical face on one side and a pair of symmetrically spaced rollers on the other side, an arcuate plate operatively mounted within said groove for to-and-fro movement therein, said plate having a smooth concave margin bearing against said rollers and a toothed convex margin bearing against the arcuate margin of the groove, a first shaft journaled in the auxiliary slide and having a gear rigidly mounted thereon for meshing engagement with the toothed margin of the plate, said first shaft also being rigidly provided with first worm gear means, a second shaft also journaled in the auxiliary slide and projecting outwardly therefrom, said second shaft being provide on its projecting end with a manually operable hand wheel and also being provided with second worm gear means in meshing engagement with the first worm gear means whereby the arcuate plate may be manually fed along its path of to-and-fro movement responsive to rotative movement imparted to the hand wheel, a tool post mounted in and projecting upwardly from the arcuate plate, and a cutting tool carried by the tool post and projecting outwardly therefrom for engagement with the surface of the tire.

References Cited in the file of this patent
UNITED STATES PATENTS

| | | |
|---|---|---|
| 2,009,524 | Schmidt | July 30, 1935 |
| 2,200,575 | Haskins | May 14, 1940 |
| 2,243,461 | Haskins | May 27, 1941 |
| 2,321,936 | Pollock | June 15, 1943 |
| 2,601,810 | James | July 1, 1952 |
| 2,749,979 | Prewett | June 12, 1956 |
| 2,751,979 | Holland | June 26, 1956 |
| 2,765,845 | Bullis | Oct. 9, 1956 |